DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 365

T879,001

METHOD FOR MAKING A STAND-UP PACKAGE BY CURTAIN COATING

Ronald W. Horiszny and John J. Murphy, both % Tennessee Eastman Company, Box 511, Kingsport, Tenn. 37662

Filed Nov. 12, 1968, Ser. No. 775,071
**Int. Cl. B29c *17/04;* B32b *1/10***
U.S. Cl. 264—90
1 Sheet Drawing. 7 Pages Specification

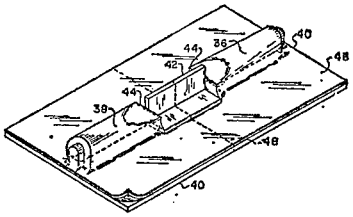

Figure 1:
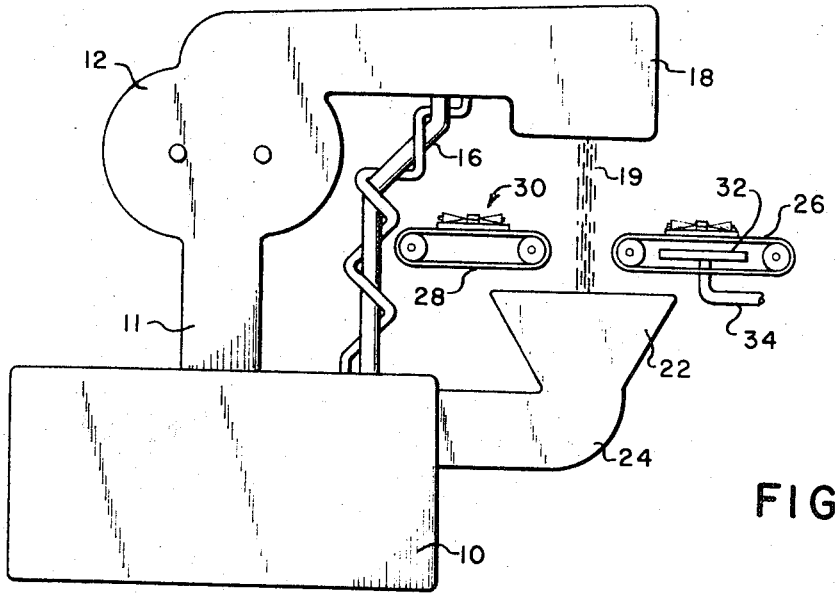
Figure 2:
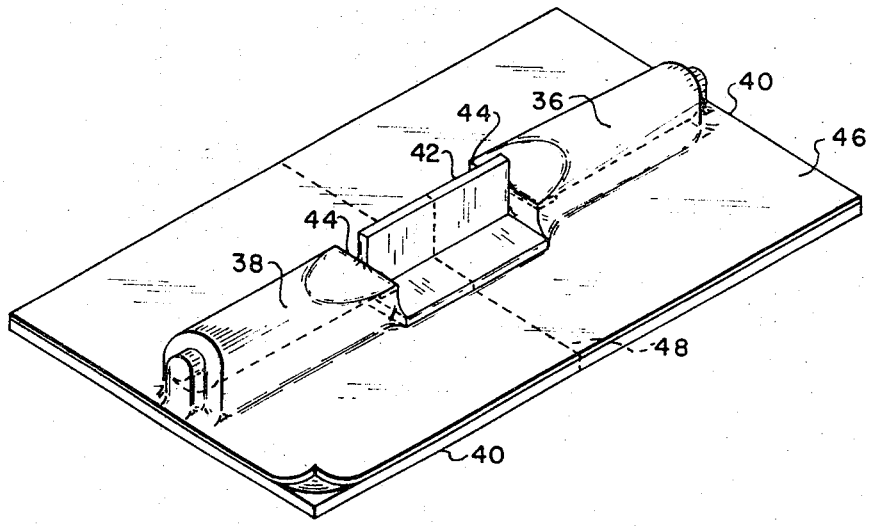

A method for forming a package capable of standing alone on a counter or other similar surface, as illustrated in FIG. 2, comprising the steps of:

(A) placing pairs of the articles to be packaged in opposed relationship on the same side of a single porous substrate, (B) placing a rigid device, capable of supporting the package in a free-standing position, on the substrate between and in contact with opposed sides of said articles, (C) simultaneously coating the substrate, the articles, and the support device with a plastic film and securing the coating to the substrate, articles and support in a skin-tight relationship, (D) severing the substrate, coating and support device between the opposed sides of the articles, thereby producing two identical free-standing packages.

Preferably, the coating is formed by passing the combination through a curtain of viscous, thermoplastic coating material as a vacuum is being created below the substrate. The intimate contact of the coating serves not only to coat the stand-up device, but also to secure it and the article to the substrate. The bottom of the card and the stand-up device are thereby insured of being in the same plane to stabilize the package when displayed.

Oct. 13, 1970 R. W. HORISZNY ET AL T879,001

METHOD FOR MAKING A STAND-UP PACKAGE BY CURTAIN COATING

Filed Nov. 12, 1968

RONALD W. HORISZNY
JOHN J. MURPHY
INVENTORS

BY George P. Chandler
ATTORNEYS